(12) United States Patent
Dubus et al.

(10) Patent No.: US 10,584,777 B2
(45) Date of Patent: Mar. 10, 2020

(54) ROLLER SCREW MECHANISM WITH CAGE

(71) Applicant: Aktiebolaget SKF, Gothenburg (SE)

(72) Inventors: Jerome Dubus, Aix les Bains (FR); Folly Abevi, Chambéry (FR)

(73) Assignee: Aktiebolaget SKF, Gothenburg (SE)

( * ) Notice: Subject to any disclaimer, the term of this patent is extended or adjusted under 35 U.S.C. 154(b) by 95 days.

(21) Appl. No.: 15/745,526

(22) PCT Filed: Aug. 7, 2015

(86) PCT No.: PCT/EP2015/068298
§ 371 (c)(1),
(2) Date: Jan. 17, 2018

(87) PCT Pub. No.: WO2017/025118
PCT Pub. Date: Feb. 16, 2017

(65) Prior Publication Data
US 2018/0209522 A1    Jul. 26, 2018

(51) Int. Cl.
*F16H 25/22*    (2006.01)
*F16K 31/50*    (2006.01)

(52) U.S. Cl.
CPC ....... *F16H 25/2252* (2013.01); *F16K 31/508* (2013.01); *F16H 2025/2257* (2013.01)

(58) Field of Classification Search
CPC .......... F16K 31/508; F16H 2025/2257; F16H 25/2252
USPC ........................................................ 251/248
See application file for complete search history.

(56) References Cited

U.S. PATENT DOCUMENTS

| | | | | |
|---|---|---|---|---|
| 1,756,650 A | * | 4/1930 | Martin, Jr. | F16K 31/535 251/183 |
| 1,784,094 A | * | 12/1930 | Fletcher | F16K 31/53 137/269 |
| 2,683,379 A | * | 7/1954 | Strandgren | F16H 25/2252 74/424.92 |
| 3,173,304 A | * | 3/1965 | Strandgren | F16H 25/2252 74/409 |
| 3,214,991 A | * | 11/1965 | Perrin | B23Q 5/40 74/424.92 |
| 3,406,584 A | * | 10/1968 | Roantree | F16H 25/2252 74/424.7 |

(Continued)

FOREIGN PATENT DOCUMENTS

| | | |
|---|---|---|
| EP | 1813506 A1 | 8/2007 |
| JP | 2007100761 A | 4/2007 |
| WO | 2015007308 A1 | 1/2015 |

*Primary Examiner* — Umashankar Venkatesan
(74) *Attorney, Agent, or Firm* — Laurence A. Greenberg; Werner H. Stemer; Ralph E. Locher (57) ABSTRACT

A roller screw mechanism has a screw provided with an outer thread, a nut surrounding and coaxial with the screw, the nut being provided with an inner thread, a plurality of rollers radially disposed between the screw and the nut and each provided with an outer thread engaging the outer and inner threads and with two outer gear teeth, and two synchronization gear teeth meshing with the gear teeth of the rollers. The mechanism further includes one retaining cage for the rollers including a plurality of pockets spaced apart one with another in the circumferential direction. At least the outer thread of each roller is located inside the associated pocket of the cage.

11 Claims, 7 Drawing Sheets

(56) References Cited

U.S. PATENT DOCUMENTS

| | | | | |
|---|---|---|---|---|
| 3,585,869 A * | 6/1971 | Lemor | ................ | F16H 25/2252 |
| | | | | 74/424.92 |
| 3,595,094 A * | 7/1971 | Lemor | ................ | F16H 25/2252 |
| | | | | 74/89.14 |
| 3,726,151 A * | 4/1973 | Lemor | ................ | F16H 25/2006 |
| | | | | 74/424.92 |
| 4,093,180 A * | 6/1978 | Strabala | ................ | F16K 31/535 |
| | | | | 251/248 |
| 4,375,770 A * | 3/1983 | Druet | ................. | F16H 25/2025 |
| | | | | 74/424.92 |
| 4,526,053 A * | 7/1985 | Carson | ................ | F16H 25/2252 |
| | | | | 74/424.75 |
| 7,736,256 B2 * | 6/2010 | Sugitani | ................... | B62D 3/02 |
| | | | | 475/333 |
| 8,020,463 B2 * | 9/2011 | Kinoshita | ........... | F16H 25/2252 |
| | | | | 74/424.91 |
| 8,943,920 B2 * | 2/2015 | Buvril | .................... | F16H 25/12 |
| | | | | 74/424.92 |
| 10,018,257 B2 * | 7/2018 | Abevi | ................. | F16H 25/2252 |
| 2004/0244520 A1 * | 12/2004 | Cornelius | ........... | F16H 25/2252 |
| | | | | 74/424.92 |
| 2016/0186887 A1 * | 6/2016 | Dubus | ................ | F16H 25/2252 |
| | | | | 251/264 |
| 2017/0204924 A1 * | 7/2017 | Pasquet | ............... | F16H 25/2252 |

* cited by examiner

ROLLER SCREW MECHANISM WITH CAGE

CROSS REFERENCE

This is a United States National Stage Application claiming the benefit of International Application Number PCT/EP2015/068298, filed on Aug. 8, 2015, which is incorporated herein by reference in its entirety.

FIELD OF THE INVENTION

The present invention relates to the field of roller screw mechanisms for transforming a rotary movement into a linear translation movement, and vice versa.

SUMMARY OF THE INVENTION

Such a mechanism is provided with a screw having an outer thread, with a nut arranged around the screw and having an inner thread, and with a plurality of longitudinal rollers having an outer thread engaging the outer and inner threads of the screw and of the nut. The outer thread of each roller is extended axially at each end by gear teeth themselves extended axially by a cylindrical stud or pivot extending outwards.

In a first type of roller screw mechanism, the threads of the rollers and the thread of the nut have helix angles that are identical to each other and different to that of the thread of the screw such that, when the screw rotates in relation to the nut, the rollers rotate on themselves and roll about the screw without moving axially inside the nut. The rollers are rotationally guided by gear wheels mounted in a non-threaded part of the nut and having inner gear teeth meshing with the gear teeth of said rollers. The roller screw mechanism further comprises two end spacer rings each mounted radially between the screw and the associated gear wheel. Each spacer ring includes a plurality of axial through-holes inside which the studs of the rollers are housed. The spacer rings enable the rollers to be carried and the regular circumferential spacing thereof to be kept. Such mechanism is called a planetary roller screw.

A second type of roller screw mechanism has a similar operating principle but is different as a result of an inverted arrangement. The helix angles of the threads of the rollers, of the screw and of the nut are selected such that, when the screw rotates in relation to the nut, the rollers rotate on themselves about the screw and move axially in the nut. The rollers are rotationally guided by outer gear teeth provided on the screw and meshing with the gear teeth of the rollers. Two spacer rings are also provided to ensure the even circumferential position of the rollers. Such mechanism is called an inverted roller screw.

It is a particular object of the present invention to provide a roller screw mechanism wherein, for a given axial dimension, the load capacity is increased.

It is a further object of the present invention to provide a roller screw mechanism having a reduced number of components.

In one embodiment, the roller screw mechanism comprises a screw provided with an outer thread, a nut surrounding and coaxial with said screw, said nut being provided with an inner thread, a plurality of rollers radially disposed between the screw and the nut and each provided with an outer thread engaging said outer and inner threads and with two outer gear teeth, and two synchronization gear teeth meshing with said gear teeth of the rollers.

The roller screw mechanism further comprises one retaining cage for the rollers comprising a plurality of pockets spaced apart one with another in the circumferential direction. At least the outer thread of each roller is located inside the associated pocket of the cage.

With such a roller screw mechanism, the number of components is reduced compared with a conventional mechanism since only one single spacing cage is provided to enable the rollers to be carried and the regular circumferential spacing thereof to be kept. To this end, a conventional roller screw mechanism comprises two spacer rings. Besides, in such a conventional mechanism, it is necessary to foresee two retainer rings in order to axially retain the spacer rings.

Otherwise, the useful length of the outer thread of each roller meshing with the threads of the screw and the nut can be increased. The design has higher stiffness, capacity ratings, lifetime and compactness. Reliability is also increased since the mechanism has less parts. This design also makes possible an automatic assembly.

Besides, with such a roller screw mechanism, it is also possible to use rollers each comprising, at each axial end, an end frontal surface oriented axially outwards and delimiting axially the associated outer gear teeth and said roller.

In other words, each gear teeth of each roller is delimited axially on the outer side by the associated end radial surface. This leads to have rollers deprived of cylindrical studs or spigots extending axially outwards the gear teeth. Accordingly, for a given axial dimension of the nut, the useful length of the outer thread of each roller meshing with the threads of the screw and the nut can be further increased while having both the rollers and the gear wheels entirely housed inside the nut.

Preferably, the cage comprises two opposite annular portions and a plurality of elongated fingers extending axially between said annular portions and delimiting the pockets.

In one embodiment, each annular portion of the cage comprises a plurality of recesses radially open inwards and into which parts of the rollers are located. The outer gear teeth of each roller may be located axially outside the cage. In this case, the cage may be entirely housed between the gear teeth. Alternatively, the outer gear teeth of each roller may be located inside the associated pocket of the cage.

Advantageously, the cage is made in one part.

In one embodiment, the gear teeth are provided in a non-threaded part of the nut. Alternatively, the gear teeth may be provided on the screw.

The invention also relates to a valve operator assembly for valve comprising a valve body and a valve translating member axially moveable. The assembly comprises a housing adapted to be mounted on the valve, an operable input member rotatably mounted with respect to said housing, and a roller screw mechanism as previously defined. The screw, or the nut, of said mechanism is adapted to be connected to the valve translating member of the valve, and the nut, or the screw, of said mechanism being connected to the input member

DETAILED DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
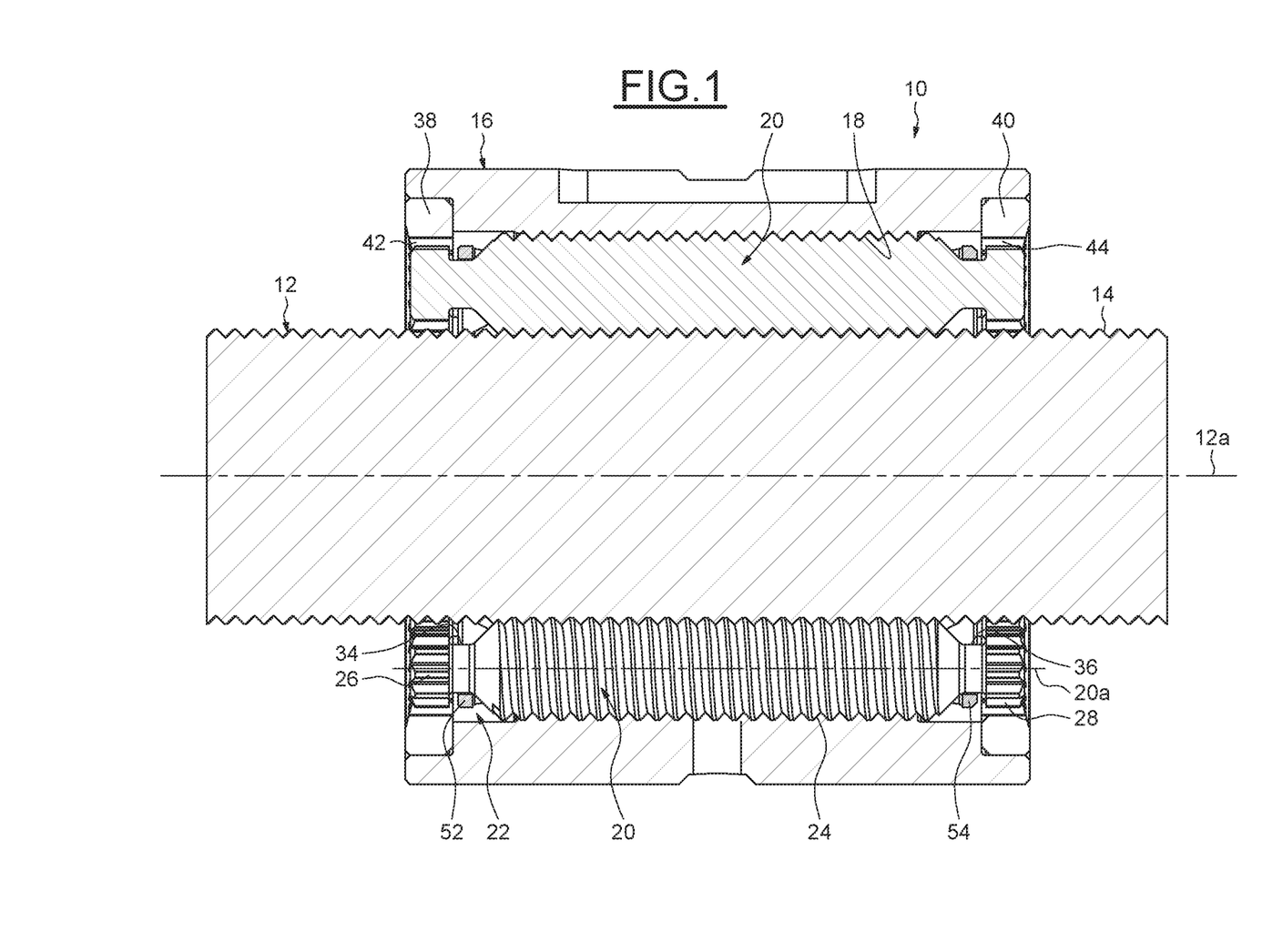
FIG. 1 is a cross-section of a roller screw mechanism according to a first example of the invention.

As shown on FIG. 1, a planetary roller screw mechanism 10 comprises a screw 12, with an axis 12a, provided with an outer thread 14, a nut 16 mounted coaxially about the screw 12 and provided with an inner thread 18, the internal diameter of which is greater than the external diameter of the outer thread 14, and a plurality of longitudinal rollers 20 arranged radially between the screw 12 and the nut 16. The screw 12 extends longitudinally through a cylindrical bore of the nut 16 on which the inner thread 18 is formed. As will be described later, the mechanism 10 further comprises one single central retaining cage 22 for maintaining the rollers 20 circumferentially spaced apart.

The rollers 20 are identical to each other and are distributed regularly around the screw 12. Each roller 20 extends along an axis 20a which is coaxial with the axis 12a of the screw and comprises an outer thread 24 engaging the thread 14 of the screw and the thread 18 of the nut.

Figure 2:
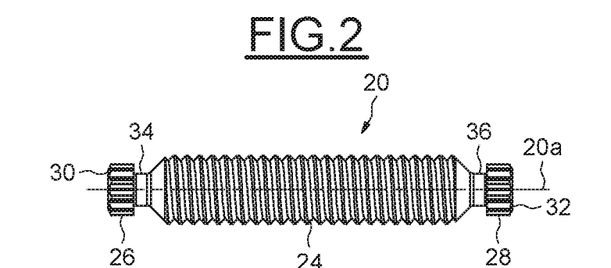
FIG. 2 is a front view of a roller of the mechanism of FIG. 1.

As shown more clearly on FIG. 2, each roller 20 also comprises, at each axial end, outer gear teeth 26, 28 extended radially by an end frontal surface 30, 32 oriented axially outwards. Each roller 20 further comprises an annular outer groove formed axially between the thread 24 and each gear teeth 26, 28 and delimiting a trunnion 34, 36. Each gear teeth 26, 28 are axially delimited by the associated groove and the end frontal surfaces 30, 32. The end frontal surfaces 30, 32 delimit axially the roller. The outer thread 24 of each roller is axially located between the two gear teeth 26, 28.

Referring once again to FIG. 1, the roller screw mechanism 10 also comprises two annular gear wheels 38, 40 fixed in a non-threaded part of the bore of the nut 16. Each gear wheel comprises inner gear teeth 42, 44 meshing the gear teeth 26, 28 respectively of the rollers 20 for the synchronization thereof. Each gear wheel 38, 40 axially bears against a radial surface of the nut provided between the inner thread 18 and the associated non-threaded part of said nut. The gear wheels 38, 40 are identical to one another. The gear wheels 38, 40 and the rollers 20 are entirely housed into the nut 16, i.e. they do not axially protrude outwards relative to the nut.

The cage 22 enables the rollers 20 to be carried and the regular circumferential spacing thereof to be kept. The rollers 20 are also axially maintained by the cage 22. The cage 22 is mounted radially between the screw 12 and the nut 16. In the illustrated example, the cage 22 is axially located between the gear teeth 26, 28 of the rollers. The cage 22 is axially entirely housed between the gear wheels 38, 40.

Figure 3:
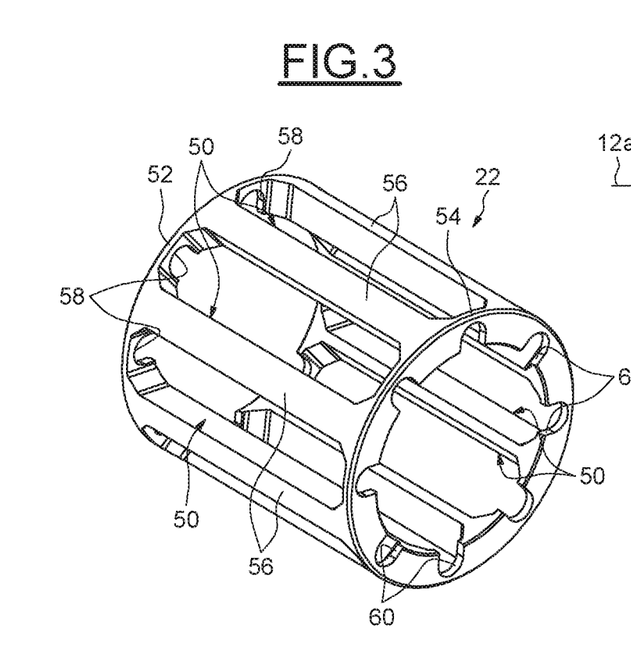
FIG. 3 is a perspective view of a cage of the mechanism of FIG. 1.
Figure 4:
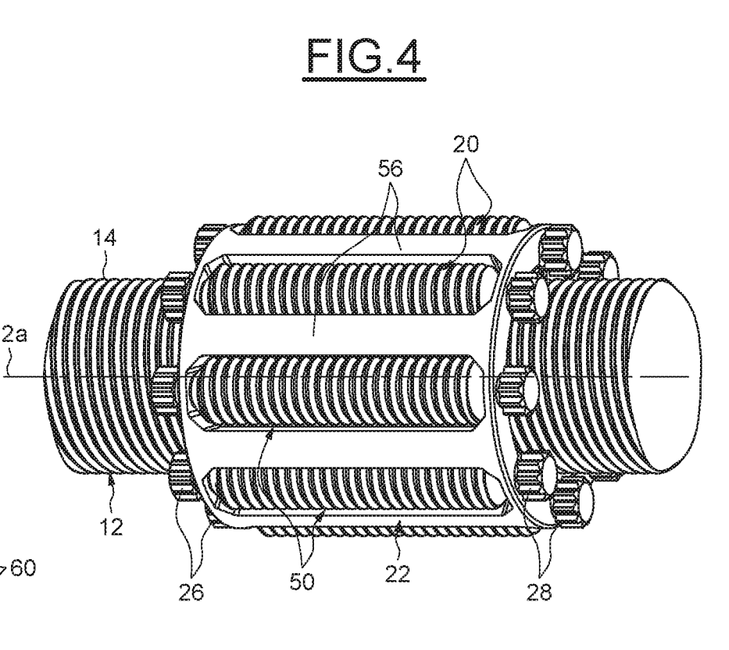
FIG. 4 is a perspective view of the mechanism of FIG. 1 without a nut and gear wheels.

As shown more clearly on FIGS. 3 and 4, the cage 22 comprises a plurality of apertures or pockets 50 which are spaced apart one with another in the circumferential direction for receiving the rollers 20. The pockets 50 are identical to one another.

The cage 22 comprises a first annular portion 52, a second annular portion 54 and a plurality of elongated fingers 56 extending axially between said portions. The fingers 56 are connected to the first and second annular portions 52, 54. In the illustrated example, the cage 20 is made in one part. The fingers 56 are spaced apart one with another in the circumferential direction. The annular portions 52, 54 delimit together with two adjacent fingers 56 one of the pockets 50. Each pocket 50 is axially delimited by facing frontal surfaces formed on the annular portions 52, 54. Said frontal surfaces form abutment surfaces for the associated roller.

In the illustrated example, the length of the pockets 50 is smaller than the rollers 20. The length of each pocket 50 is adapted to receive only the outer thread 24 of the associated roller. The outer thread 24 of each roller extends into the associated pocket 50. The gear teeth 26, 28 of each roller are located outside the cage 22. The annular portion 52 of the cage is axially located between the gear teeth 26 of each roller and its outer thread 24 while the annular portion 54 is axially located between said outer thread and the other gear teeth 28 of said roller. The annular portions 52, 54 are radially located between the rollers 20 and the nut 16 (FIG. 1). The fingers 56 are radially located between the screw 12 and the nut 16. Each finger 56 is circumferentially located between two successive rollers 20.

The cage 22 further comprises first and second group of recesses 58, 60 respectively formed on the annular portions 52, 54. The recesses 58, 60 axially open on both sides and radially open inwards. The recesses 58, 60 are distributed regularly in the circumferential direction. The trunnions 34, 36 of the rollers 22 are located inside the recesses 58, 60 of the cage.

Figure 5:
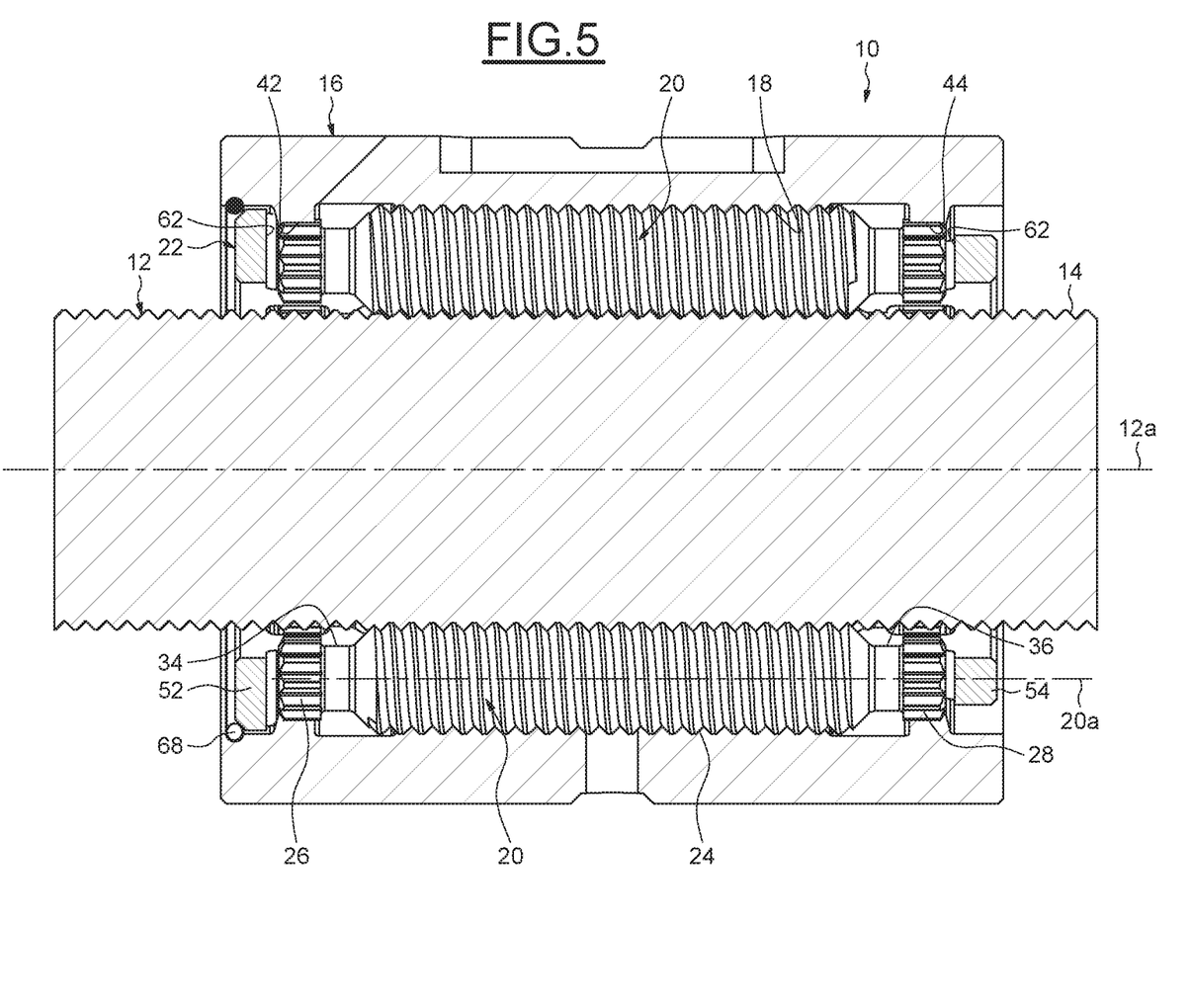
FIG. 5 is a cross-section of a roller screw mechanism according to a second example of the invention.
Figure 6:
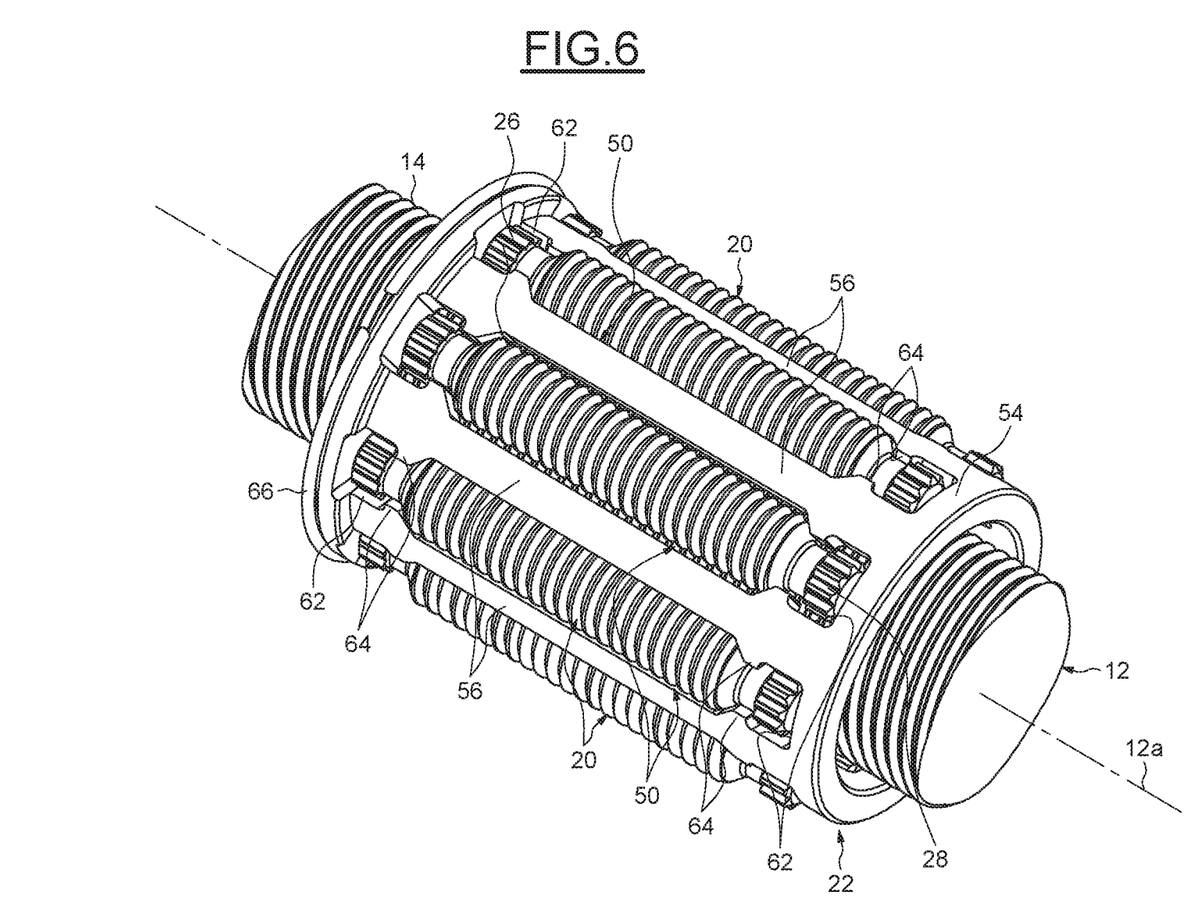
FIG. 6 is a perspective view of the mechanism of FIG. 5 without a nut.

In the second example illustrated on FIGS. 5 and 6, in which identical parts are given identical references, the synchronization gear teeth 42, 44 meshing the gear teeth 26, 28 of the rollers 20 are directly formed on the nut 16. The mechanism 10 is deprived of gear wheels fixed in the bore of the nut 16. In this example, the gear teeth 42, 44 are axially offset towards the inside of the nut 16.

In this example, each pocket 50 of the cage comprises, at each axial end, a recess 62 for the mounting of the associated gear teeth 26, 28 of the roller. In this example, each roller 20 is entirely located inside the associated pocket 50 of the cage. For each roller 20, both the outer thread 24 and the gear teeth 26, 28 are located inside the associated pocket 50.

Each finger 56 of the cage comprises two associate ribs 64 protruding inside each adjacent pocket 50 towards one of the trunnions 34, 36 of the roller 20. Each trunnion 34, 36 is maintained between two ribs 64 opposed in the circumferential direction. The cage 20 further comprises an annular flange 66 extending radially outwards the annular portion 62 while remaining distant from the bore of the nut 16. In this example, the mechanism 10 also comprises a retainer ring 68 mounted in a groove provided in the bore of the nut 16 to axially hold the cage 20. The retainer ring 68 axially bears against the flange 66 of the cage.

In the two previous examples, the invention has been illustrated on the basis of a planetary roller screw mechanism. The example illustrated on FIGS. 7 and 8, in which identical parts are given identical references, differs in that the mechanism 10 is of the inverted roller screw type.

Figure 7:
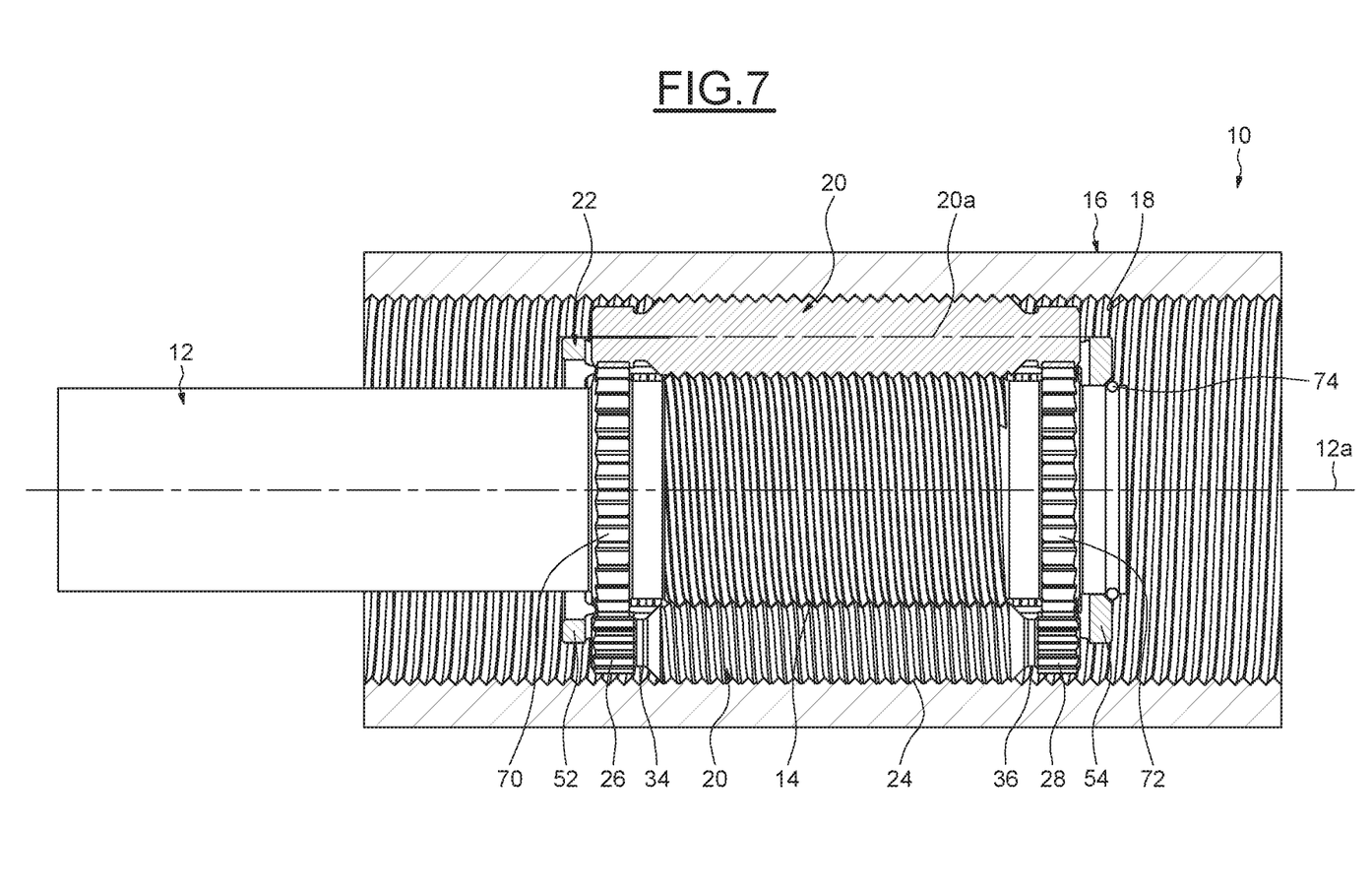
FIG. 7 is a cross-section of a roller screw mechanism according to a third example of the invention.
Figure 8:
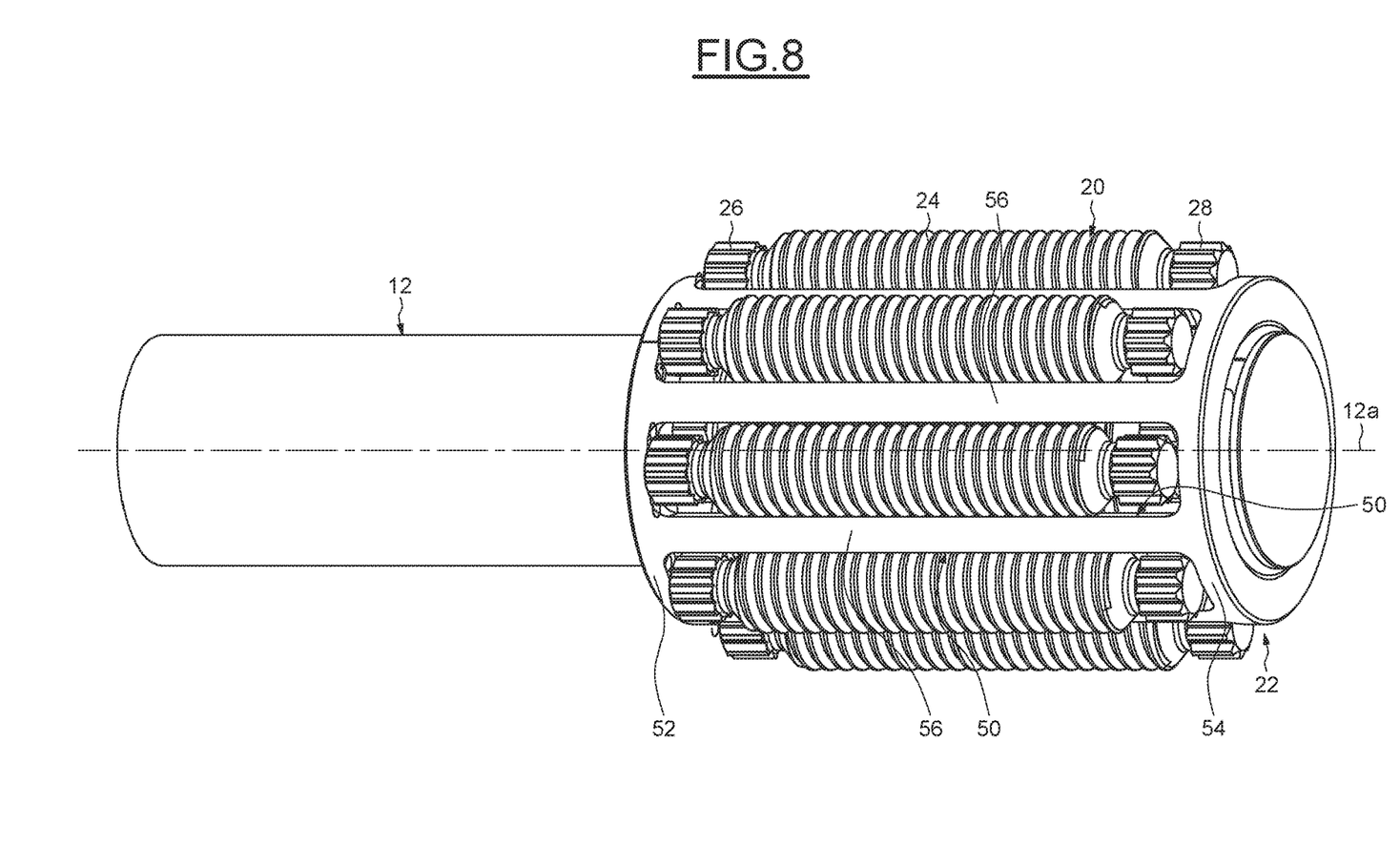
FIG. 8 is a perspective view of the mechanism of FIG. 7 without a nut.

The screw 12 is provided with two outer synchronization gear teeth 70, 72 meshing the gear teeth 26, 28 respectively of the rollers 20. The gear teeth 70, 72 are formed on the outer surface of the screw 12. The gear teeth 70, 72 are identical to one another and axially disposed on either side of the outer thread 14. In the illustrated example, the gear teeth 70, 72 are formed directly on the screw 12. Alternatively, it could be possible to foresee annular gear wheels fixed on the outer surface of the screw 12 and each comprising synchronization gear teeth. Similarly to the second illustrated example, each roller 20 is entirely located inside the associated pocket 50 of the cage. The mechanism 10 also comprises a retainer ring 74 mounted in a groove provided on the outer surface of the screw 12 to axially hold the cage 20. The retainer ring 68 axially bears against the annular portion 54 of the cage.

In the illustrated examples, each gear teeth 26, 28 of the rollers are axially spaced apart from the outer thread 24 by the associated groove. Alternatively, for the second and third examples, the thread 24 of each roller may be extended axially at each end by the gear teeth 24, 26. In another variant, a smooth space portion may be provided axially between the thread 24 and each gear teeth 26, 28.

Figure 9:
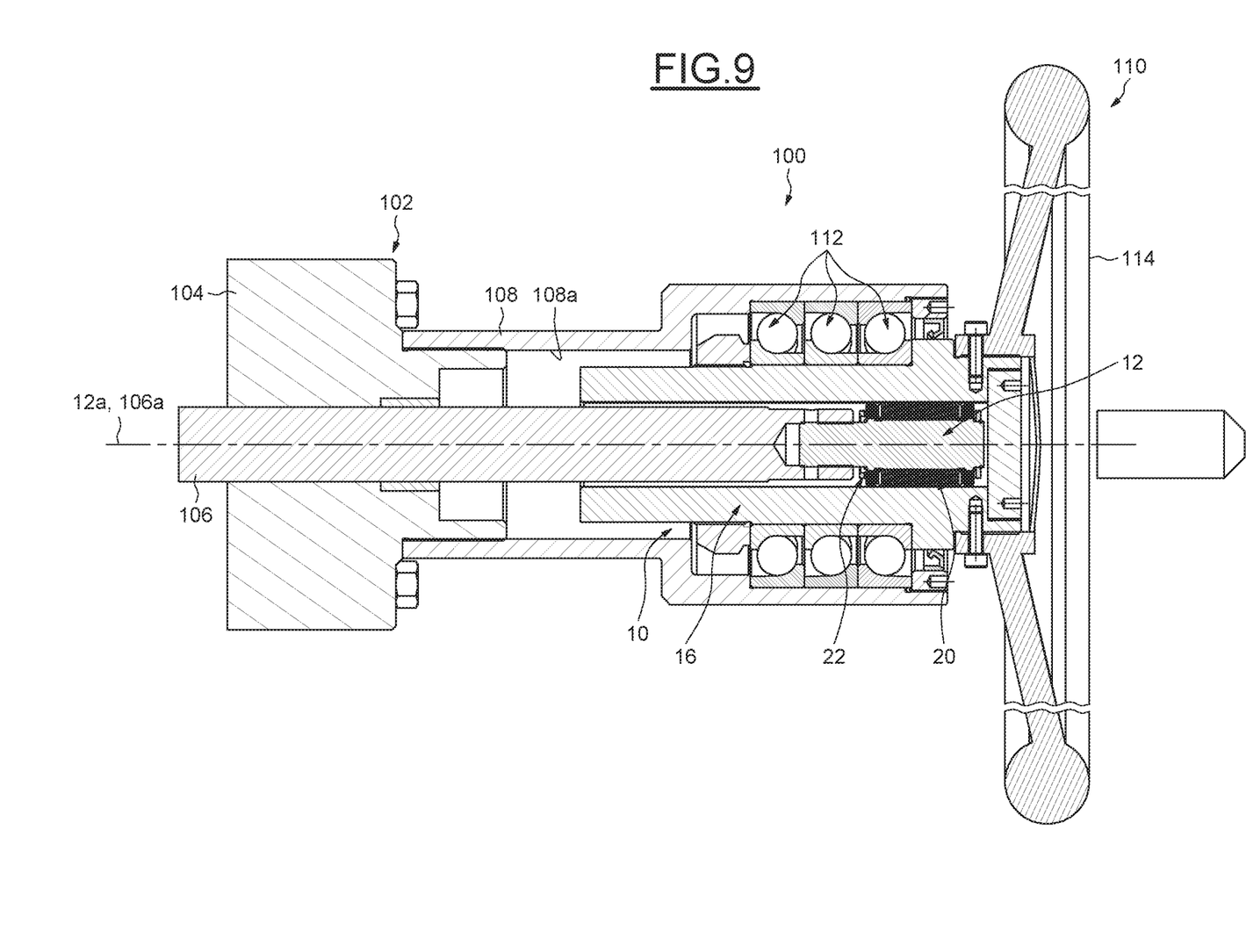
FIG. 9 is a cross-section of a valve operator assembly for gate valve comprising the mechanism of FIG. 7.

A valve operator assembly 100 as shown on FIG. 9 comprises the inverted roller screw mechanism 10 as described in the third example. The assembly 100 is adapted for a gate valve 112 provided with a bonnet 114, a valve body (not shown) covered by said bonnet and a moveable valve stem 106 with an axis 106a coaxial with the axis 12a of the mechanism 10.

The valve operator assembly 100 comprises a tubular housing 108 mounted on the bonnet 104 of the gate valve, an input member 110 rotatably mounted with respect to said housing, and the inverted roller screw mechanism 10 interposed between said input member and the valve stem 106 of said valve to convert a rotational motion of the input member 110 into axial motion of the valve stem.

The mechanism 10 is mounted into a bore 108a of the housing and is connected to the input member 110. In the illustrated example, the bore 108a has a stepped form. Alternatively, the bore 108a may have different shape. The valve operator assembly 10 also comprises rolling bearings 112 to guide the rotation of the nut 16 of the inverted roller screw mechanism. The rolling bearings 112 are radially mounted between the outer surface of the nut 16 and the stepped bore 108a of the housing.

The input member 110 comprises an operable hand-wheel 114 secured to the nut 16. The hand-wheel 114 forms a rotational drive input. Axially on the side opposite to the input member 110, a recess is formed on a frontal radial surface of the screw 12 and into which is mounted an end of the valve stem 106 of the gate valve. The valve stem 16 is connected to the screw 12 by any appropriate means, for example by threads and/or a pin.

In the illustrated example, the valve operator assembly comprises an inverted roller screw mechanism 10. Alternatively, the valve operator assembly may comprise the planetary roller screw mechanism 10 as disclosed in the first or second illustrated example.

Although the valve operator as illustrated comprises a screw connected to the valve stem of the gate and a nut connected to the input member, it is possible to have a screw connected to the input member and a nut connected to the valve stem. In this case, the nut acts as the translating element and the screw acts as the rotating element. The valve operator assembly may also be used with other types of valves, for instance control or regulation valves or choke valves. The input member may be operable manually or automatically for example with electric, hydraulic or pneumatic drive. The valve operator assembly may be used for instance with a surface gate or a subsea valve gate which may be actuated by a remote operating vehicle (ROV) torque tool or an actuator.

The invention claimed is:

1. A roller screw mechanism comprising:
   a screw provided with an outer thread,
   a nut surrounding and coaxial with the screw, the nut being provided with an inner thread, and
   a plurality of rollers radially disposed between the screw and the nut and each provided with an outer thread engaging the outer and inner threads and with two outer gear teeth, the mechanism further providing two synchronization gear teeth meshing with the gear teeth of the rollers,
   one retaining cage for the rollers having a plurality of pockets spaced apart one with another in the circumferential direction, and
   at least the outer thread of each roller being located inside the associated pocket of the cage, and
   the outer gear teeth of each roller being located axially outside the cage.

2. The mechanism according to claim 1, wherein each roller comprises, at each axial end, an end frontal surface delimiting axially the associated outer gear teeth and the roller.

3. The mechanism according to claim 1, wherein the cage comprises two opposite annular portions and a plurality of elongated fingers extending axially between the annular portions and delimiting the pockets.

4. The mechanism according to claim 3, wherein each annular portion of the cage comprises a plurality of recesses radially open inwards and into which parts of the rollers are located.

5. The mechanism according to claim 1, wherein the outer gear teeth of each roller are located inside the associated pocket of the cage.

6. The mechanism according to claim 1, wherein the cage is made in one part.

7. The mechanism according to claim 1, wherein the synchronization gear teeth are provided in a non-threaded part of the nut.

8. The mechanism according to claim 1, wherein the synchronization gear teeth are provided on the screw.

9. A valve operator assembly for a valve comprising:
   a valve body, and a valve translating member axially moveable, the assembly further comprising:
   a housing adapted to be mounted on the valve,
   an operable input member rotatably mounted with respect to the housing, and a roller screw mechanism according to claim 1, the screw, or the nut, of the mechanism being adapted to be connected to the valve translating member of the valve, and the nut, or the screw, of the mechanism being connected to the input member.

10. A valve operator assembly for a valve comprising:
    a valve body, and a valve translating member axially moveable, the assembly further comprising:
    a housing adapted to be mounted on the valve,
    an operable input member rotatably mounted with respect to the housing;
    a roller screw mechanism having:
    a screw provided with an outer thread,
    a nut surrounding and coaxial with the screw, the nut being provided with an inner thread;

a plurality of rollers radially disposed between the screw and the nut and each provided with an outer thread engaging the outer and inner threads and with two outer gear teeth, the mechanism further providing two synchronization gear teeth meshing with the gear teeth of the rollers;

one retaining cage for the rollers having a plurality of pockets spaced apart one with another in the circumferential direction;

at least the outer thread of each roller being located inside the associated pocket of the cage; and the screw, or the nut, of the mechanism being adapted to be connected to the valve translating member of the valve, and the nut, or the screw, of the mechanism being connected to the input member.

11. The mechanism according to claim 10, wherein the outer gear teeth of each roller are located axially outside the cage.

\* \* \* \* \*